US009226022B2

(12) United States Patent
Ferguson

(10) Patent No.: US 9,226,022 B2
(45) Date of Patent: Dec. 29, 2015

(54) METHOD OF SWITCHING FROM A FIRST ENCODED VIDEO STREAM TO A SECOND ENCODED VIDEO STREAM

(75) Inventor: Keith Lamont Ferguson, Pretoria (ZA)

(73) Assignee: CSIR, Pretoria (ZA)

( * ) Notice: Subject to any disclaimer, the term of this patent is extended or adjusted under 35 U.S.C. 154(b) by 714 days.

(21) Appl. No.: 13/060,688

(22) PCT Filed: Aug. 26, 2008

(86) PCT No.: PCT/IB2008/053418
§ 371 (c)(1),
(2), (4) Date: Feb. 24, 2011

(87) PCT Pub. No.: WO2010/023504
PCT Pub. Date: Mar. 4, 2010

(65) Prior Publication Data
US 2011/0161517 A1 Jun. 30, 2011

(51) Int. Cl.
*H04N 7/173* (2011.01)
*H04N 7/24* (2011.01)
*G06F 15/16* (2006.01)
*H04N 21/44* (2011.01)
(Continued)

(52) U.S. Cl.
CPC ..... *H04N 21/44016* (2013.01); *H04N 7/17318* (2013.01); *H04N 21/23424* (2013.01); *H04N 21/4384* (2013.01)

(58) Field of Classification Search
CPC .................. H04N 19/00242; H04N 19/00321; H04N 21/2383; H04N 21/6405; H04N 21/6408
USPC .......................................................... 709/231
See application file for complete search history.

(56) References Cited

U.S. PATENT DOCUMENTS 5,990,955 A * 11/1999 Koz ......................... 375/240.01
7,904,581 B2 * 3/2011 Sherer et al. .................. 709/231
8,488,066 B2 * 7/2013 Gao .............................. 348/731
2006/0088094 A1 * 4/2006 Cieplinski et al. ....... 375/240.01
(Continued)

FOREIGN PATENT DOCUMENTS

EP 1 887 802 A1 2/2008
WO WO 97//08898 A1 3/1997

OTHER PUBLICATIONS

International Search Report, PCT/IB2008/053418, Jun. 17, 2009.
(Continued)

*Primary Examiner* — Kevin Bates
*Assistant Examiner* — Nazia Naoreen
(74) *Attorney, Agent, or Firm* — Daniel J. Chalker; Chalker Flores, LLP

(57) ABSTRACT

The invention relates to a method (300, 310) of switching from a source encoded video stream (134) to a destination encoded video stream (108), and to an apparatus (100), a video platform (210) and a system (200) therefor. The method (300, 310) includes providing an intermediate switching stream (130) which is dependent upon the destination stream (108), the switching stream (130) including a plurality of successive GOP sequences, each GOP sequence including an initial I-frame and at least one successive P-frame. The method (300, 310) further includes switching from the source video stream (134) to the I-frame of a GOP sequence of the switching stream (130) and then switching from the switching stream (130) to the destination stream (108) such that the subsequent frames of the destination stream (108) can be decoded using the accumulated reference of the GOP sequence of the switching stream (130).

21 Claims, 6 Drawing Sheets

(51) Int. Cl.
*H04N 21/234* (2011.01)
*H04N 21/438* (2011.01)

(56) References Cited

U.S. PATENT DOCUMENTS

| | | | | |
|---|---|---|---|---|
| 2007/0192812 | A1* | 8/2007 | Pickens et al. | 725/94 |
| 2010/0036964 | A1* | 2/2010 | Cedervall et al. | 709/231 |
| 2010/0312905 | A1* | 12/2010 | Sandmann et al. | 709/231 |

OTHER PUBLICATIONS

Brightwell et al., “Flexible Switching and Editing of MPEG-2 Video Bitstreams”, International Broadcasting Convention, London, Sep. 12, 1997, 547-552.

Martin Ljungqvist, “Bayesian Decoding for Improved Random Access in Compressed Video Streams”, Internet Citation, May 12, 2005.

* cited by examiner

METHOD OF SWITCHING FROM A FIRST ENCODED VIDEO STREAM TO A SECOND ENCODED VIDEO STREAM

FIELD OF INVENTION

The invention relates generally to streaming video and particularly to a method of switching from a source encoded video stream to a destination encoded video stream, and further to an associated apparatus and system.

BACKGROUND OF THE INVENTION

The Inventor is aware that current applications suitable for real-time video broadcasting in a server/client network environment having multiple content channels, each at potentially multiple bit rates, require the ability of the clients to switch seamlessly and quickly between channels and the bit rates. The advent of using digitally encoded video streams has created inherent problems in providing these qualities. The existing switching solutions cater for high bit rate conditions defined as those where the delivery channel average bit rate available for each client is greater than that of the stream being delivered. These solutions cannot provide guaranteed fast switching at low bit rates without disruption to the video flow at the client.

The Inventor is aware that compressed video streams are typically made up of sequences of consecutive frames divided into groups of pictures (GOP). The GOP consists of an I-frame, independent of other previous frames, followed by one or more P-frames or B-frames that are predicted from surrounding frames within the same group. For the same visual quality, I-frames typically require upward of three times the number of bits than those required by P-frames or B-frames. Switching between statistically dissimilar streams, such as when “channel hopping”, or entering a stream for the first time, must occur on an I-frame. P-frame switching requires a matching prediction reference at a decoder or client. The prediction reference is a frame stored internally to the encoder and is required to be an exact representation of the output of the decoder. If switching is done on a P-frame without matching references, then the accumulated mismatch resulting from the incorrect reference produces visual artefacts at the decoder. This is commonly referred to as drift error.

The Inventor is also aware of the practice of switching between similar streams where one stream is only a different average bit rate version of the other stream, but otherwise from the same original video source, utilising SI-frames or SP-frames (S-frames). These are bridging frames between the two streams and seek to encode the differences between the current stream and the destination stream to ensure close matching prediction references to reduce the drift error. However, these bridging frames also may generate significantly more bits than the standard P-frames and, furthermore, every bridging frame is required to be a unique S-frame.

The frequency of the I/S-frames in the stream determines the switching points. In other words, a destination channel can be switched on an I-frame or immediately after receipt of an S-frame so that subsequent P-frames have a matching internal reference frame. Thus, a stream having a high frequency of I/S-frames has more potential switching points, at the cost of an increased average bit rate which is only tolerable in channels supporting high average bit rates For the purposes of this specification, a low bit rate stream or channel may be defined having sufficient bandwidth only to sustain P-frames and, at best, a few or low quality I-frames in the order of thousands of frames apart (minutes in time). This implies no or a very limited number of natural switching points. Increasing the frequency of I/S-frames results in an increased bit cost which potentially cannot be sustained in low bit rate channels, causing disruption (not seamless) to the video service where re-buffering at the decoder is required.

To provide a fast, seamless low bit rate service where the switching time from one stream to another is both short and deterministic requires the period of I-frames (for dissimilar streams) or S-frames (for similar streams) to be in the order of less than 1 s (second). Thus, for any switch from one channel to another, the period of disruption will be less than 1 s (on average 0.5 s), until the next I-frame or S-frame is received and the following P-frames have a sufficiently matching reference with which to be decoded without noticeable drift error.

The problem which the Inventor has identified is to switch randomly between two arbitrary (similar or dissimilar) encoded video streams within a short time interval at any (low or high) bit rate without disrupting the frame rate or introducing noticeable long term drift errors. The Inventor therefore wishes to overcome or at least minimise this problem.

PRIOR ART

The H.264 International Standard video coding definition [1] has standardised the concept of S-frames for switching between similar streams. This was based on a proposal by Karczewicz and Kurceren [2, 3] and an explanation of its design has been presented in academic publications [4]. Alternative S-frame designs have been proposed as in the use of wavelet transforms [5] to reduce the number of bits of the S-frame. These methods use a single switching frame and therefore mostly produce more bits per S-frame than the destination stream and cannot guarantee seamless switching in a low bit rate environment with unnoticeable drift error. Another method used is not to switch with an S-frame but to choose a direct switching point where the difference between the current and destination frames are below the noticeable drift error [6]. This method cannot guarantee a switching time within a specified limit. Side information may also be used to estimate the difference between the reference frames of both the switching from and switching to streams but will also require more bits than may be available on the channel [7]. All these methods however rely on the statistical similarities of the current and destination streams and are therefore unsuited for “channel hopping”.

SUMMARY OF INVENTION

Accordingly, the invention provides a method of switching from a source encoded video stream to a destination encoded video stream, the method including:

- providing an intermediate switching stream which is dependent upon the destination stream, the switching stream including a plurality of successive GOP sequences, each GOP sequence including an initial I-frame and at least one successive P-frame;
- switching from the source video stream to the I-frame of a GOP sequence of the switching stream; and
- switching from the switching stream to the destination stream such that the subsequent frames of the destination stream can be decoded using the accumulated reference of the GOP sequence of the switching stream.

In other words, the method may provide switching progressively or gradually from the source stream to the destination stream using an intermediate GOP sequence (of the switching stream). Thus, the initial I-frame of a particular GOP sequence of the switching stream may provide an entry point from the source stream into the switching stream. Accordingly, the successive frames of a particular GOP sequence of the switching stream may converge towards the corresponding frames of the destination stream. By converge is meant that successive frames of a particular GOP sequence of the switching stream and corresponding frames of the destination stream may have a progressively decreasing drift error.

The switching stream may be dependent solely upon the destination stream. Instead, the switching stream may be dependent upon both the destination stream and a video input.

Each GOP sequence of the switching stream may have a short period or duration. By short period is meant that switching from the source stream to the switching stream and thereafter to the destination stream may be done quickly and preferably seamlessly without introducing noticeable long term drift error artefacts. The period of each GOP sequence of the switching stream may be shorter, optionally one or more orders of magnitude shorter, than a period of each GOP sequence (i.e. period between successive I-frames) of the destination stream. The period of each GOP may be less than 1 s.

The initial I-frame of a particular GOP sequence of the switching stream may provide an entry point from the source stream into the switching stream. Therefore, when a switch request is received (e.g. by a user changing channels), the method may include delaying switching from the source stream to the switching stream until an I-frame of a GOP sequence of the switching stream is detected, thereby switching directly to the I-frame of the GOP sequence. Thus, the delay in switching from the source stream to the destination stream may be no longer than the period of the GOP sequence of the switching stream, and assuming random switch requests, an average of half the period. Thus, if, for example, the period is 1 s, the delay in switching may be between 0 s and 1 s (depending on when the switch request is received relative to a particular GOP sequence), and on average, 0.5 s.

A frame rate of the switching stream may match that of the destination stream. Each frame of the switching stream may have a bit rate which matches that of a corresponding or simultaneous frame of the destination stream. Thus, there may be no change in frame rate and/or bit rate between the switching and destination streams, thus ensuring a seamless stream from the perspective of a decoder or client (or other receiver device) when receiving the switching and destination streams.

Each frame of the switching stream may be calculated or derived from the corresponding frame of the destination stream using existing algorithms or frame encoding techniques.

The encoding of each frame in the switching stream may be subject to a bit allocation strategy where a maximum (or average) distortion is minimised subject to a total bit constraint equal to (or less than) the total number of bits in a corresponding frame in the destination stream. The distortion may be measured as the difference between the references of the switching and destination streams. This encoding strategy may ensure that the drift error is minimised.

The method may include comparing a decoded frame of the switching stream with a corresponding decoded frame of the destination stream thereby to determine whether the difference between the two frames is below a predefined drift error threshold. In such case, the method may include switching from the switching stream to the destination stream only in response to the difference between corresponding frames of respective streams being below the drift error threshold. If the difference between corresponding frames of respective streams is not below the drift error threshold, the method may include streaming a successive frame of the switching stream.

Each GOP sequence of the switching stream may comprise a fixed number of frames or a variable number of frames. If the number is fixed, the number may be user-definable (e.g. 10 frames for each GOP sequence). If the number is variable, a new GOP sequence (and hence a new switching stream I-frame) may be triggered in response to determining that the difference between corresponding frames of the switching and destination streams is below the drift error threshold. If the number is fixed, the period of the GOP sequence may be determined by the frame rate. For example, if the GOP sequence is fixed at 10 frames and the frame rate is 25 frames per second, the period will be $^{10}/_{25}$ s or roughly 0.4 s.

The method may find particular application in communications channels having a low bandwidth or otherwise only able to support low bit rates, but the application is naturally not necessarily limited to such communications channels.

The source and destination streams may be independent streams (e.g. having entirely different content) or may be dependent streams (e.g. having the same content but at a different frame/bit rate).

The invention extends to a machine-readable medium having stored thereon a set of instructions which, when executed by a machine, causes the machine to perform a method as defined above.

The invention extends to a video encoding apparatus which includes a main encoder operable to receive an input video stream and, based thereon, to encode a destination video stream with reference to a reference frame, the video encoding apparatus further including:

a switching encoder which is dependent on the main encoder, the switching encoder receiving as an input both the reference frame from the main encoder and the number of bits generated for each frame of the destination stream by the main encoder, thereby to generate each corresponding frame of the switching stream including a plurality of successive GOP sequences, each GOP sequence including an initial I-frame and at least one successive P-frame.

More particularly, the switching encoder may be operable to use the reference frame of the main encoder as an input for encoding each frame of the switching stream, the number of bits of a particular encoded frame of the destination stream acting as a bit rate constraint for a corresponding frame of the switching stream.

The switching encoder may additionally receive as an input the input video stream (i.e. the input to the main encoder). The switching encoder may use the input video stream to generate the I-frame of each GOP sequence.

Alternatively, if the switching encoder does not receive as an input the input video stream, it may use the reference frame from the main encoder to generate the I-frame.

The invention extends further to a video delivery platform which includes a plurality of apparatus as defined above.

The video delivery platform may include:

a plurality of apparatus switches, each apparatus switch associated with a particular apparatus and operable to switch between the switching stream and destination stream of that apparatus; and a platform switch operable to select a stream from a particular apparatus as an output of the video delivery platform.

The invention further extends to a system for streaming video, the system including a video delivery platform, as defined above, and at least one decoder. The video delivery platform and the decoder may be interconnected by means of a telecommunications network.

BRIEF DESCRIPTION OF DRAWINGS

The invention will now be further described, by way of example, with reference to the accompanying diagrammatic drawings.

In the drawings.

DETAILED DESCRIPTION OF PREFERRED EMBODIMENT

Figure 1:
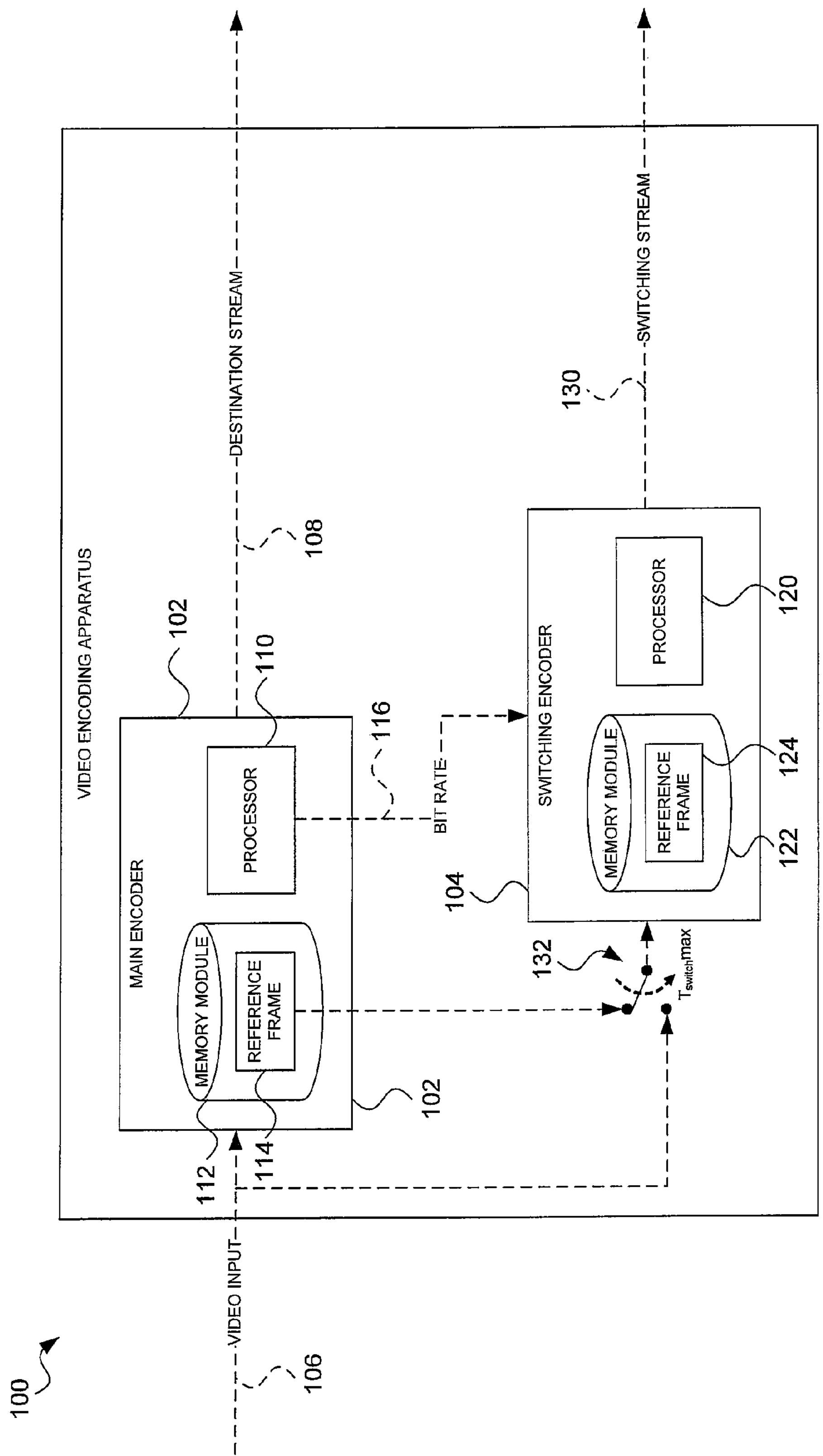
FIG. 1 shows a schematic view of a video encoding apparatus, in accordance with the invention.

Referring first to FIG. 1, reference numeral 100 generally indicates a video encoding apparatus in accordance with the invention. The apparatus 100 includes a main encoder 102 which is configured to receive a video input 106 and, in conventional fashion, to encode that video input 106 into a destination encoded video stream 108. The video input 106 may be of any suitable format which the main encoder 102 is configured to recognise.

The main encoder 102 includes, in conventional fashion, a processor 110 which is configured or programmed to direct the operation of the main encoder 102. The main encoder 102 further includes a memory module 112 (which may be any convenient high speed storage medium, main memory, or the like) which is operable to store thereon, at least temporarily, a reference frame used for encoding a corresponding frame in the destination stream 108.

The destination stream 108 includes a plurality of GOP sequences which, in conventional fashion, begin with a reference I-frame and include thereafter a plurality of smaller bit rate P-frames. However, in this example, the apparatus 100 has been configured for transmitting video streams across low bandwidth channels or connections. Therefore, frames of the destination stream 108 are configured to have relatively low bit rates and the I-frames are thus few and far between, and their particular placement in the destination stream 108 is not necessarily deterministic.

In accordance with the invention, the apparatus 100 also includes a switching encoder 104, which similarly includes a processor 120 and a memory module 122. The switching encoder 104 is operable to receive as an input at least the reference frame 114 from the main encoder 102 and an indication 116 of the instantaneous bit rate for each frame in the destination stream 108. The switching encoder 104, under the direction of the processor 120, is then operable to generate a switching stream 130 which comprises a plurality of successive GOP sequences having relatively short periods. A GOP sequence of the switching stream 130 comprises an initial I-frame followed by a plurality of P-frames. Although the number of frames in a particular GOP sequence could be variable, in this example, the number is fixed to 10.

The apparatus 100 is illustrated as a single device comprising two encoders 102, 104. It is, however, to be appreciated that the apparatus 100 could comprise a plurality of discrete devices networked together. Further, although the main and switching encoders 102, 104 are illustrated separately, they could, if desired, be consolidated into a single module or unit, sharing a common processor. Further, although not illustrated, the apparatus 100 includes a machine-readable medium having stored there on a set of instructions in the form of a computer program. The computer program thus directs the operation of the processors 110, 120 which, accordingly, direct operation of the apparatus 100.

As mentioned above, the processor 120 of the switching encoder is operable to generate two different types of frames for the switching stream 130, namely I-frames and P-frames. The P-frames are generated using the reference frame 114 and the bit rate of a corresponding frame in the destination stream 108. Thus, by using the bit rate of the frames of the destination stream 108 as a bit rate constraint, the frames of the switching stream 130 have a bit rate matched to that of corresponding frames of the destination stream 108.

While it is possible to generate the I-frames in the same manner as the P-frames described above, in this example, the I-frames are generated using as an input the video input 106 itself (instead of the reference frame 114 of the main encoder 102) and the bit rate of the corresponding frame of the destination stream 108. Thus, the reference frame 124 as stored on the memory module 122 of the switching encoder 104 will, for the P-frames, be converging towards the reference frame 114 of the main encoder 102 but will, for the I-frames, rather be a new reference frame derived from the video input 106, for better performance.

Therefore, a switch 132 is configured to switch the input to the switching encoder 104 from the reference frame 114 to the video input 106 and back again every switching cycle, which in this example is every $10^{th}$ frame.

The reference frames of the switching stream 130 within a particular GOP sequence converge towards the reference frames of the destination stream 108. This means that the drift error between a decoded switching frame and a corresponding decoded destination frame decreases from the initial I-frame to the last P-frame of that GOP sequence. Further, the switching encoder 104 is configured such that the drift error between the final P-frame of a GOP sequence of the switching stream 130 and the corresponding frame of the destination stream will be below a predefined drift error threshold. Potentially, the difference between one or more previous frames of the GOP sequence of the switching stream 130 and the corresponding frames of the destination stream 108 may also be below the drift error threshold, depending on the content of the video input, and switching to the destination stream 108 could therefore occur before the $10^{th}$ frame, but at least by the $10^{th}$ frame.

Figure 2A:
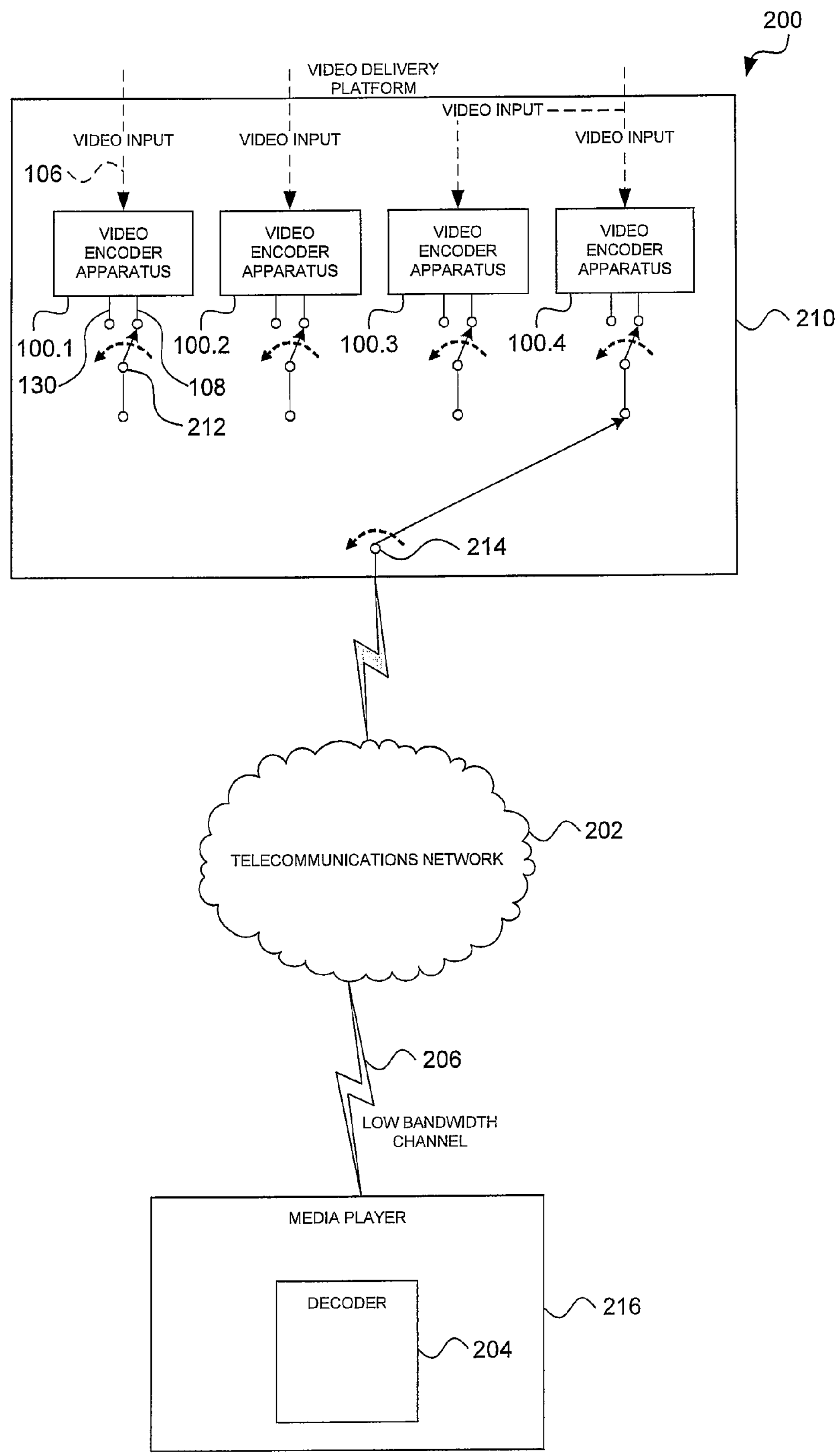
FIG. 2*a* shows a schematic view of a system including the apparatus of FIG. 1.

Referring now to FIG. 2*a*, a system 200 includes a video delivery platform 210 which encapsulates at least one, and typically a plurality of, video encoder apparatus 100 of FIG. 1. In this example, the video delivery platform 210 includes four video encoder apparatus 100.1, 100.2, 100.3, 100.4 (collectively referred to as apparatus 100). The video encoder apparatus 100.1, 100.2 have respective independent video channel input streams 106, while the video encoder apparatus 100.3, 100.4 have the same video channel input stream 106, for the purpose of generating differing bit rate versions of the same channel.

The video delivery platform 210 is connected via a telecommunications network 202 to at least one media player 216 which encapsulates a decoder 204. The telecommunications network 202 in this example includes the Internet which may, from time-to-time, exhibit low throughput rates. The media player 216 is connected to the telecommunications network 202 by means of a low bandwidth channel 206 (or a high bandwidth channel which has intermittent low bandwidth throughputs) and is therefore not able to receive continuous and reliable high bandwidth content. It is for this reason that the video delivery platform is configured to transmit a relatively low bandwidth stream.

The video delivery platform 210 includes a plurality of switches 212, 214. An apparatus switch 212 is associated with each apparatus 100 and is operable to switch between the destination stream 130 and the switching stream 108 of its associated apparatus 100. A single platform switch 214 is operable to select a stream (whether the destination stream 108 or the switching stream 130) from a particular apparatus 100 as an output of the video delivery platform 210. In other words, the platform switch is operable selectively to designate the output of a particular apparatus 100 as the master output of the video delivery platform 210. It is therefore to be understood that the apparatus 100 provide a plurality of destination streams, each of which is available for selection as an output by the video delivery platform 210.

The video delivery platform 210 is operable to receive switch requests from any source, either remotely, as from a user of the media player 216, or locally, from an external controller. Local switch requests may be triggered from a measurement of the telecommunications network 202 to indicate a different available bandwidth (for dependent streams), or, for example, from a tag that forces a switch to an advertisement channel (for independent streams).

The media player 216 is operable to receive switch requests from a user, for example in the form of channel change requests. Therefore, in conventional fashion, a user may view one video stream by means of the media player 216 and at any time may send a switch request (i.e. change channel) thereby to view a different video stream or channel. The media player 216 need not necessarily be reconfigured or changed for use in accordance with the invention and may in fact be entirely oblivious to or independent of the configuration of the apparatus 100 and the video delivery platform 210.

Once the media player 216 receives a switch request to view a different stream (i.e. a destination stream 108), it communicates this switch request to the video delivery platform 210.

Figures 3, 4:
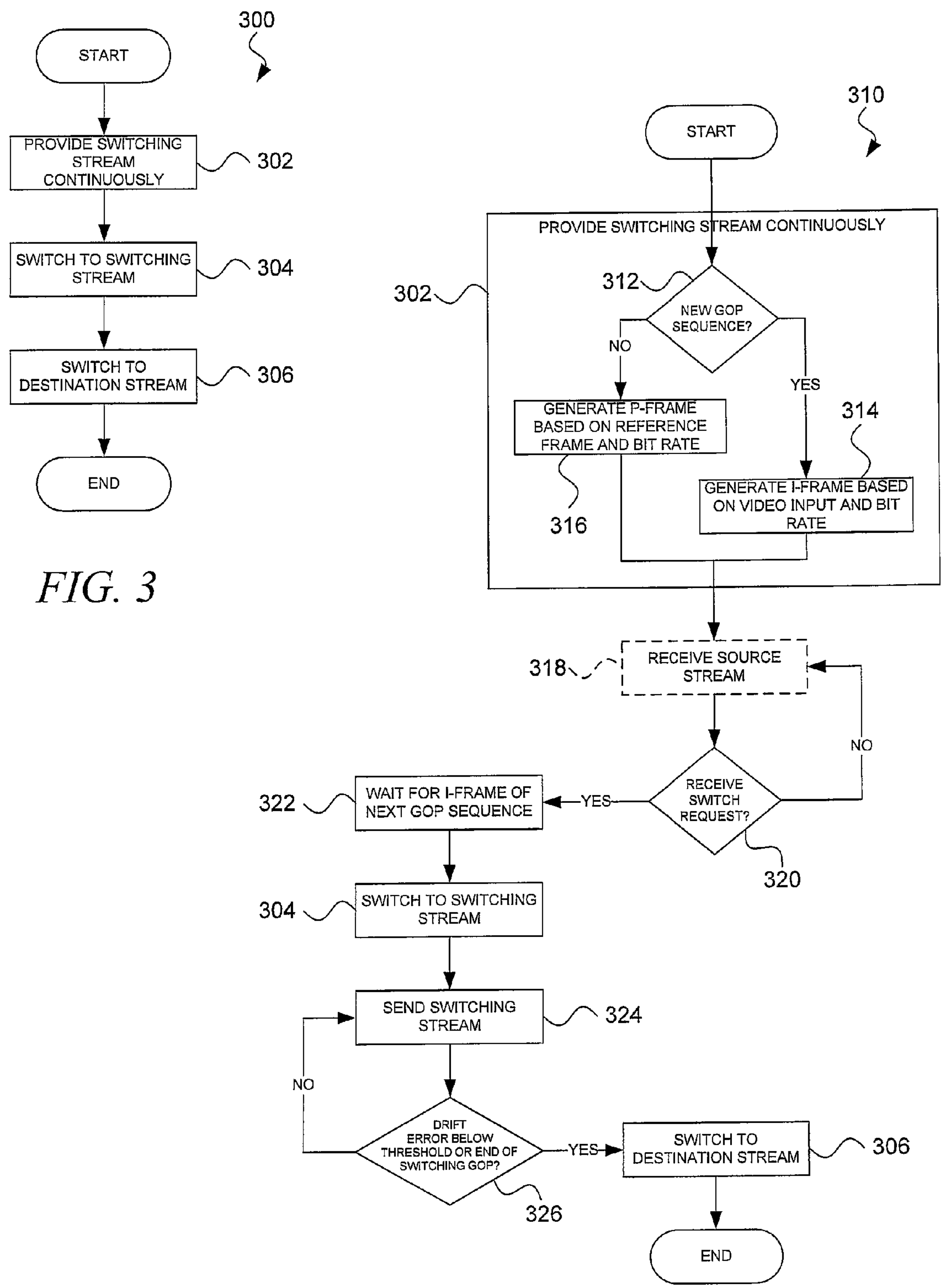
FIG. 3 shows a high-level flow diagram of a method, in accordance with the invention.
FIG. 4 shows a low-level flow diagram of a method, in accordance with the invention.

The invention will now be further described, in use, with reference first to FIG. 3 and then to FIG. 4. FIG. 3 shows a high-level flow diagram of a method 300 in accordance with the invention. From a very high level perspective, the switching stream 130 is continuously provided or made available, at block 302, by the apparatus 100. In response to a switch request, the apparatus 100 switches (or is switched), at block 304, to the switching stream 130. Finally, the apparatus 100 switches (or is switched) to the destination stream 108.

Figure 2B:
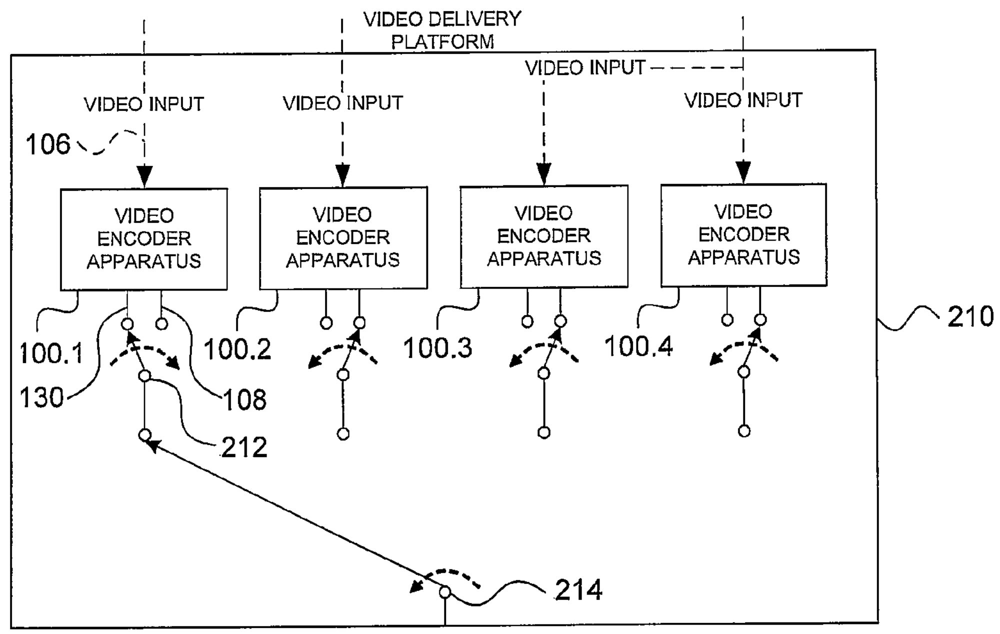
FIGS. 2*b* and 2*c* show respective portions of the system of FIG. 2*a;*
Figure 2C:
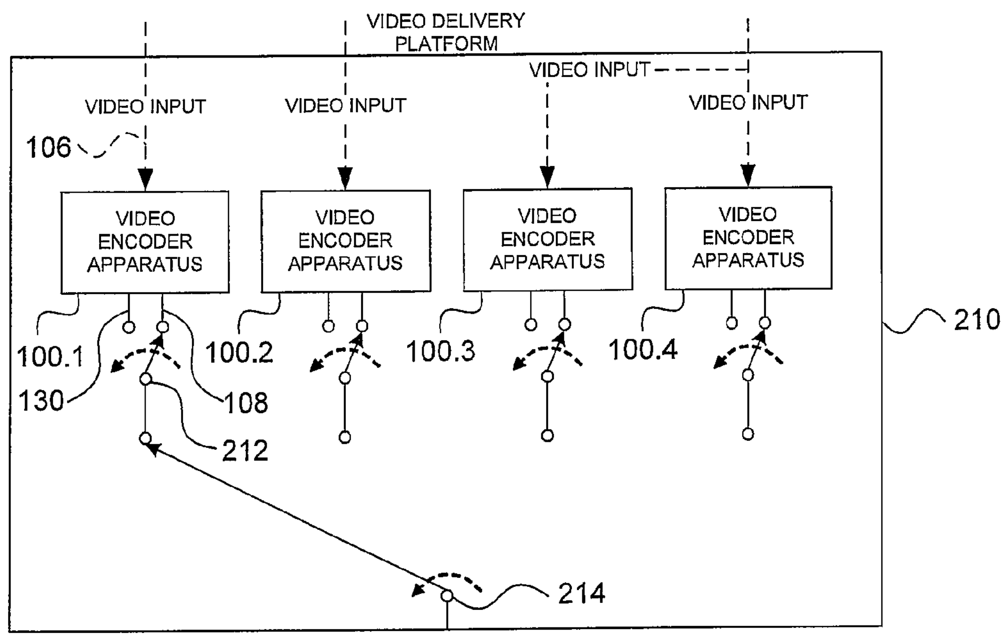
Figure 5:
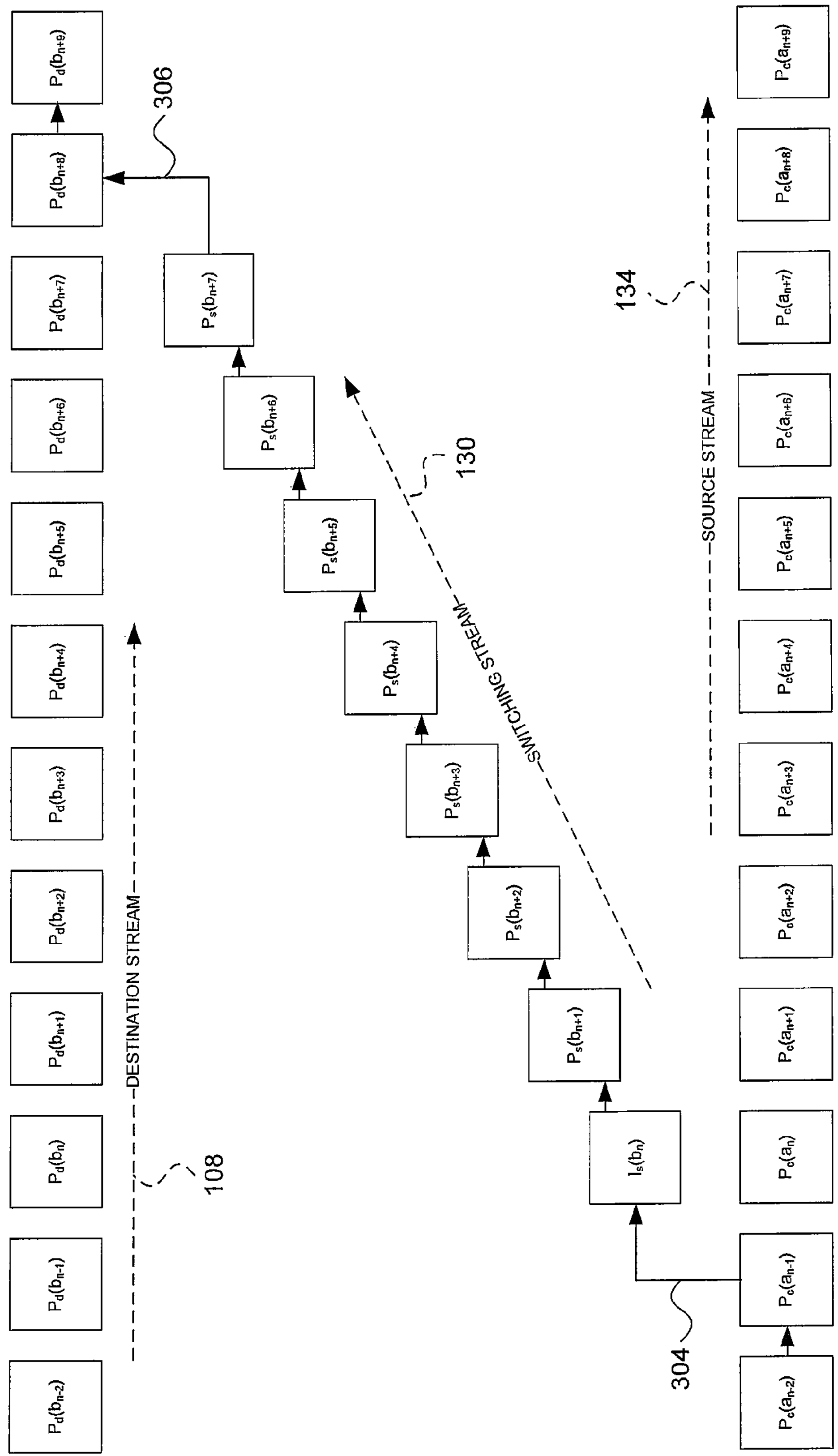
FIG. 5 shows a schematic view of frames of a plurality of video streams, in accordance with the invention.

Referring now to FIG. 4, a low-level flow diagram of a method 310 describes the invention in more detail, and reference is also made to FIGS. 2*b* and 2*c* and to FIG. 5 which shows a schematic view of frames of a plurality of video streams. The methods 300, 310 are described with reference to the apparatus 100 and the system 200, although naturally it is to be appreciated that the methods 300, 310 may be applicable to different apparatus or systems and that the apparatus 100 and system 200 may be configured to perform different methods, if the context so dictates.

Each apparatus 100 continuously generates two streams, i.e. the destination stream 108 and switching stream 130. The switching stream 130 is continuously generated based on the destination stream 108. As described above, the switching stream 130 includes a plurality of successive GOP sequences. To create the sequence, the switching encoder 104 determines, at block 312, whether or not to begin a new GOP sequence. If so, an I-frame is generated, at block 314, based on the video input 106 and the bit rate of the corresponding frame of the destination stream 108. If not, a P-frame is generated, at block 316, based on the reference frame 114 of the main encoder 102 and the bit rate.

By way of example, the media player 216 is busy receiving, at block 318, a source stream 134 from the apparatus 100.4 which is being viewed by the user. (The source stream 134 thus corresponds to the destination stream 108 of the apparatus 100.4.) Refer to FIG. 2*a*, in which the platform switch 214 is connected to the apparatus 100.4 and the apparatus switch 212 of the apparatus 100.4 is connected to the destination stream 108 (i.e. the source stream 134). The source stream 134 could be a television channel or a streaming video. At some arbitrary point, the user wishes to view a different stream. The user accordingly inputs a switch request, for example by changing channel, on a user interface provided by the media player 216, in conventional fashion. The media player 216 is in fact oblivious to the happenings within the video delivery platform 210.

For instance, the switch request indicates that the destination stream to be provided to the media player 216 is from the apparatus 100.1. The video delivery platform 210 must therefore switch from the stream supplied by the apparatus 100.4 to the stream supplied by the apparatus 100.1.

Once the switch request is received, at block 320, by the media player 216, it is communicated to the video delivery platform 210 which then waits, at block 322, for an appropriate entry point into the switching stream 130 of apparatus 100.1. The switching stream 130 must be entered on the initial I-frame of a new GOP sequence. Given that, in this example, any GOP sequence is fixed to 10 frames, the apparatus will never wait longer than 0.4 s (for a stream having a frame rate of 25 frames per s), and on average will wait half that. Accordingly, when the next I-frame (denoted by $I_s(b_n)$ in FIG. 5) is generated, at block 314, the video delivery platform 210 switches, at block 304, to the switching stream 130 of the apparatus 100.1 and begins sending, at block 324, the switching stream 130 to the media player 216 for decoding by the decoder 204. From the point of view of the decoder 204, it has begun receiving a new stream and it is irrelevant whether it is a switching or a destination stream.

To achieve this switching, the apparatus switch 212 of the apparatus 100.1 switches to the switching stream 130 and the platform switch 214 switches to the apparatus 100.1 (refer to FIG. 2*b*).

The video delivery platform 210 could have been configured to stream the entire GOP sequence (all 10 frames) of the switching stream 130 and, at the end, switch to the destination stream 108. However, in this example, for quicker switching to the destination stream 108, the video delivery platform 210 compares each decoded frame of the switching stream 130 with a corresponding decoded frame of the destination stream 108 to determine, at block 326, whether or not the drift error is below a predefined drift error threshold. In FIG. 5, the frames of the switching stream 130 are illustrated as converging upon the frames of the destination stream 108, which illustrates the fact that the drift error between corresponding frames decreases successively. Once the drift error is below the drift error threshold (in this example, after frame $P_s(b_{n+7})$), the video delivery platform 210 switches, at block 306, to the destination stream 108 even though the GOP sequence of the switching stream 130 is not yet completed. To achieve this, the apparatus switch 212 of the apparatus 100.1 simply switches from the switching stream 130 to the destination stream 108 (referred to FIG. 2*c*).

If there is no source stream 134, nothing is sent until the I-frame ($I_s(b_n)$) of the GOP sequence.

By way of summary, after receiving a switch request, the remainder of the frames ($P_c(a_{n-2})$ and $P_c(a_{n-1})$) of the source stream 134 are played until the I-frame $I_s(b_n)$ is detected, at which point the first switch occurs. Frames $P_s(b_{n+1})$ to $P_s(b_{n+7})$ of the switching stream 130 are then sent until the drift error is below the drift error threshold, at which point frames $P_d(b_{n+8})$ onward from the destination stream 108 are sent. It should be noted again that the bit rate (denoted by ($b_e$)) for corresponding frames in the switching and destination streams 130, 108 is the same. Thus, the decoder 204 experiences no change in bit rate when switching from the switching stream 130 to the final destination stream 108. A "switching path" is illustrated in FIG. 5 by means of arrows interconnecting the frames comprising the switching path.

Thus the viewer, who is viewing the video stream, presented to him by the decoder 204, experiences only a short switching delay (in the order of tenths of a second) with little or no perceptible drift error even at low bit rates.

The destination stream 108 is then sent indefinitely until there is another switch request, at which point the method may be repeated, at least partially.

Figure 6:
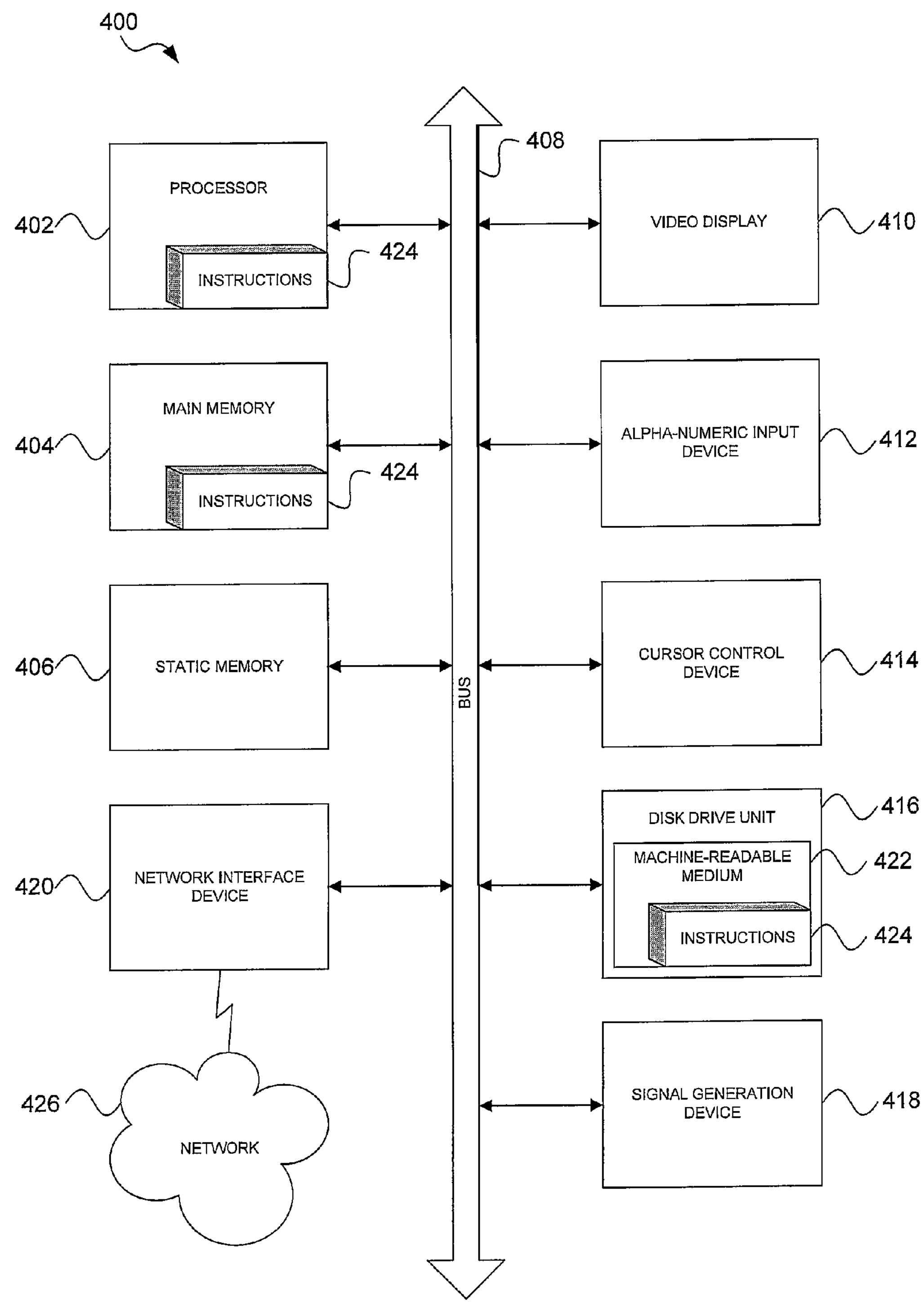
FIG. 6 shows a diagrammatic representation of a machine in the example form of a computer system within which a set of instructions, for causing the machine to perform any one or more of the methodologies discussed herein, may be executed.

FIG. 6 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD), a plasma display, or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilised by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilising any one of a number of well-known transfer protocols (e.g., HTTP, RTP, RTSP, FTP).

While the machine-readable medium 422 is shown in an example embodiment to be a single medium, the term "machine-readable medium" should be taken to include a single medium or multiple media (e.g., a centralised or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present embodiments, or that is capable of storing, encoding or carrying data structures utilised by or associated with such a set of instructions. The term "machine-readable medium" shall accordingly be taken to include, but not be limited to, solid-state memories, optical and magnetic media, and carrier wave signals.

The apparatus 100 may be in the form of the computer system 400 or may at least include some of the components thereof.

The Inventor believes that the invention as exemplified provides a method of switching from one video stream to another, with little delay and little or no perceptible drift error, which can be applied to channels having a wide range of bandwidth capacities, including low bandwidth channels.

REFERENCES

[1] "Advanced Video Coding for Generic Audiovisual Services" ITU-T Recommendation H.264 & ISO/IEC 14 496-10 AVC, 2005.

[2] M. Karczewicz and R. Kurceren, "A Proposal for SP-Frames," ITU-T Video Coding Experts Group Meeting, Eibsee, Germany, Jan. 9-12, 2001, Doc. VCEG-L-27.

[3] U.S. Pat. No. 6,765,963, "Video decoder architecture and method for using same," United States Patent, July 2004.

[4] M. Karczewicz and R. Kurceren, "The SP- and SI-Frames Design for H.264/AVC," IEEE Transactions on Circuits and Systems for Video Technology, Vol. 13, No. 7, July 2003, pp. 637-644.

[5] W. Zhang and B. Zeng, "Seamless Bit-Stream Switching in Multirate-Based Video Streaming Systems," EURASIP Journal on Applied Signal Processing, Vol. 2006, Article ID 49084, pp. 1-11.

[6] B. Xie and W. Zeng, "Fast Bitstream Switching Algorithms for Real-Time Adaptive Video Multicasting," IEEE Transactions on Multimedia, Vol. 9, No. 1, January 2007, pp. 169-175.

[7] M. Guo, Y. Lu, F. Wu, D. Zhao and W. Gao, "Wyner-Ziv Switching Scheme for Multiple Bit-Rate Video Streaming," IEEE Transactions on Circuits and Systems for Video Technology, Vol. 18, No. 5, May 2008, pp. 569-581.

The invention claimed is:

1. A method of switching from a source encoded video stream to a destination encoded video stream in a low bandwidth channel or a high bandwidth channel which has intermittent low bandwidth throughputs where an independent stream is provided to every client and each client may control the switching process without impacting on any other client stream viewing the same source or destination stream, the method comprising the steps of:

providing an intermediate switching stream which is dependent upon the destination stream, the switching stream including a plurality of successive GOP (Group of Pictures) sequences, each GOP sequence including an initial I-frame and at least one successive P-frame, wherein successive frames of each GOP sequence of the switching stream and corresponding frames of the destination stream have a progressively decreasing drift error;

switching from the source video stream to the I-frame of a GOP sequence of the switching stream; and switching from the switching stream to the destination stream such that the subsequent frames of the destination stream can be decoded using the accumulated reference of the GOP sequence of the switching stream.

2. A method as claimed in claim 1, in which each GOP sequence of the switching stream has a short period or duration.

3. A method as claimed in claim 2, in which the period of each GOP sequence of the switching stream is at least one order of magnitude shorter than a period of each GOP sequence (i.e. period between successive I-frames) of the destination stream.

4. A method as claimed in claim 1, in which the initial I-frame of a particular GOP sequence of the switching stream provides an entry point from the source stream into the switching stream.

5. A method as claimed in claim 4, which includes delaying switching from the source stream to the switching stream until the I-frame of a GOP sequence of the switching stream is detected, thereby switching directly to the I-frame of the switching stream GOP sequence.

6. A method as claimed in claim 1, where for every frame in the destination stream there is a corresponding matching frame in the switching stream such that the frame rate of the switching stream is identical to that of the destination stream.

7. A method as claimed in claim 1, in which each and every frame of the switching stream has a frame bit rate which matches that of a corresponding frame in the destination stream such that the frame bit rate of the switching stream never exceeds that of the destination stream.

8. A method as claimed in claim 7, in which the encoding of each frame in the switching stream operates without an output encoding buffer by subjecting the frame encoder of the switching stream to a frame bit allocation strategy where a maximum or average distortion for each and every frame is minimised subject to a total frame bit constraint equal to or less than the total number of bits in the corresponding frame in the destination stream.

9. A method as claimed in claim 1, which includes comparing a decoded frame of the switching stream with a corresponding decoded frame of the destination stream thereby to determine whether or not the difference between the two frames is below a predefined drift error threshold.

10. A method as claimed in claim 9, which includes switching from the switching stream to the destination stream only in response to the difference between corresponding frames of respective streams being below the drift error threshold.

11. A method as claimed in claim 1, in which each GOP sequence of the switching stream comprises a fixed number of frames.

12. A method as claimed in claim 1, in which each GOP sequence of the switching stream comprises a variable number of frames.

13. A method as claimed in claim 12, in which a new GOP sequence (and hence a new I-frame) is triggered in response to determining that the difference between corresponding frames of the switching and destination streams is below a drift error threshold for the previous pair of switching and destination frames.

14. A non-transitory machine-readable medium having stored thereon a set of instructions which, when executed by a machine, causes the machine to perform a method of switching from a source encoded video stream to a destination encoded video stream in a low bandwidth channel or a high bandwidth channel which has intermittent low bandwidth throughputs where an independent stream is provided to every client and each client may control the switching process without impacting on any other client stream viewing the same source or destination stream, the method comprising the steps of:

providing an intermediate switching stream which is dependent upon the destination stream, the switching stream including a plurality of successive GOP (Group of Pictures) sequences, each GOP sequence including an initial I-frame and at least one successive P-frame, wherein successive frames of each GOP sequence of the switching stream and corresponding frames of the destination stream have a progressively decreasing drift error;

switching from the source video stream to the I-frame of a GOP sequence of the switching stream; and switching from the switching stream to the destination stream such that the subsequent frames of the destination stream can be decoded using the accumulated reference of the GOP sequence of the switching stream.

15. A video encoding apparatus which includes a main encoder operable to receive an input video stream and, based thereon, to encode a destination video stream with reference to a reference frame in a low bandwidth channel or a high bandwidth channel which has intermittent low bandwidth throughputs, the video encoding apparatus further comprising:

a switching encoder which is dependent on the main encoder, the switching encoder receiving as an input both the reference frame from the main encoder and a number of bits generated for each frame of the destination stream by the main encoder, thereby to generate each corresponding frame of the switching stream including a plurality of successive GOP (Group of Pictures) sequences, each GOP sequence including an initial I-frame and at least one successive P-frame, wherein successive frames of each GOP sequence of the switching stream and corresponding frames of the destination stream have a progressively decreasing drift error.

16. An apparatus as claimed in claim 15, in which the switching encoder is operable to use the reference frame of the main encoder as an input for encoding each frame of the switching stream, the number of bits of a particular encoded frame of the destination stream acting as a bit rate constraint for a corresponding frame of the switching stream.

17. An apparatus as claimed in claim 15, in which the switching encoder additionally receives as an input the input video stream (i.e. the input to the main encoder) and uses the input video stream to generate the I-frame of each GOP sequence.

18. A video delivery platform which includes a plurality of apparatus, each video apparatus including a main encoder operable to receive an input video stream and, based thereon, to encode a destination video stream with reference to a reference frame in a low bandwidth channel or a high bandwidth channel which has intermittent low bandwidth throughputs, the video encoding apparatus further comprising:

a switching encoder which is dependent on the main encoder, the switching encoder receiving as an input both the reference frame from the main encoder and a number of bits generated for each frame of the destination stream by the main encoder, thereby to generate each corresponding frame of the switching stream including a plurality of successive GOP (Group of Pictures) sequences, each GOP sequence including an initial I-frame and at least one successive P-frame, wherein successive frames of each GOP sequence of the switching stream and corresponding frames of the destination stream have a progressively decreasing drift error.

19. A video delivery platform as claimed in claim 18, which includes:

a plurality of apparatus switches, each apparatus switch associated with a particular apparatus and operable to switch between the switching stream and destination stream of that apparatus; and a platform switch operable to select a stream from a particular apparatus as an output of the video delivery platform.

20. A system for streaming video, the system including:

a video delivery platform comprising:

a plurality of apparatus, each video apparatus including main encoder operable to receive an input video stream and, based thereon, to encode a destination video stream with reference to a reference frame in a low bandwidth channel or a high bandwidth channel which has intermittent low bandwidth throughputs, the video encoding apparatus further comprising:

a switching encoder which is dependent on the main encoder, the switching encoder receiving as an input both the reference frame from the main encoder and a number of bits generated for each frame of the destination stream by the main encoder, thereby to generate each corresponding frame of the switching stream including a plurality of successive GOP (Group of Pictures) sequences, each GOP sequence including an initial I-frame and at least one successive P-frame, wherein successive frames of each GOP sequence of the switching stream and corresponding frames of the destination stream have a progressively decreasing drift error; and at least one decoder.

21. A system as claimed in claim 20, in which the video delivery platform and each decoder are interconnected via a telecommunications network including the Internet which may, from time-to-time, exhibit low throughput rates.

* * * * *